United States Patent [19]
Pecar

[11] 3,949,309
[45] Apr. 6, 1976

[54] NON-LINEAR PROCESSOR FOR ANTI-JAM OPERATION
[75] Inventor: Joseph A. Pecar, Potomac, Md.
[73] Assignee: The United States of America as represented by the Secretary of the Navy, Washington, D.C.
[22] Filed: Nov. 9, 1971
[21] Appl. No.: 196,930

[52] U.S. Cl. ............................. 325/473; 343/18 E
[51] Int. Cl.² ...................... G01S 7/36; H04B 1/10
[58] Field of Search .................... 325/473, 474, 477; 343/18 E

[56] References Cited
UNITED STATES PATENTS
3,353,146 11/1967 Vartanian ..................... 325/474 X
3,621,401 11/1971 Young, Jr. ........................ 325/473

*Primary Examiner*—Malcolm F. Hubler
*Attorney, Agent, or Firm*—Richard S. Sciascia; John W. Pease; John F. Miller

[57] ABSTRACT

A non-linear signal processor reduces or eliminates the effects of a continuous wave jamming frequency in a communication signal. Mixing, filtering, and summing operations are used to isolate and eliminate the jamming frequency.

3 Claims, 4 Drawing Figures

NON-LINEAR PROCESSOR FOR ANTI-JAM OPERATION

BACKGROUND OF THE INVENTION

The invention is in the field of electronic communication apparatus. A serious problem in electronic communications is caused by extraneous "noise" signals received with the information signals. Noise signals are generated by various natural and manmade agencies, and their suppression is a design problem of major proportions in the manufacture of communications equipment. Noise signals generated deliberately by hostile agencies for the purpose of "jamming" communication signals are a serious problem. Here powerful noise signals are transmitted in the communication channels in an effort to "jam" or impede communication.

Flexible and reliable communications are becoming an increasingly important factor in warfare. As a result, the impact of enemy jamming on communications facilities is receiving ever increasing attention. One of the simplest jamming techniques is to use a continuous wave (CW) or slowly varying (Swept CW) jammer. This can be implemented with simple oscillators and narrow band power amplifiers. Generally speaking, the anti-jam strategy is to develop sufficiently effective countermeasures. In the case of narrow band (CW) jamming, an effective countermeasure would force the jammer to more "wideband" techniques wherein his effectiveness can be partially mitigated. A corresponding example exists for "pulse" jamming. In this case a jammer can get "peak" power advantage over unprotected communications transmitters and the anti-jam technique is to employ interleaved coding which essentially spreads the effect of the jammer over larger time intervals.

CW jamming can be counteracted in two ways, i.e. (1) by filtering and (2) by cancellation. The cancellation technique involves a two-loop (phase-amplitude) cancellation feedback control system. By comparison filter techniques are not sensitive to either the level or the phase of the jammer but can have a degrading effect on the desired signal. An ideal filtering approach would be to cause a "tracking" very narrow band stop filter to track the CW signal. To the extent that the filter has a non-zero bandwidth, is also the extent to which the desirable communications signal is suppressed. Therefore it is desirable to use a filter with a stop-band as narrow as possible. At intermediate frequencies of 70 or 700 MHz (typical IF frequencies used in military equipment) the state-of-the-art filter design imposes severe restrictions. The invention is an alternative to conventional tracking filter approaches.

SUMMARY OF THE INVENTION

The invention provides means for mixing an incoming signal having a jamming frequency component with the jamming frequency in one channel and with the jamming frequency phase displaced by 90° in a second channel, passing first mixer outputs through bandpass filters to isolate and eliminate the jamming frequency, then remixing the filtered signals, summing the output signals of the two channels and filtering the summer output to reconstitute the desired communication signal.

DESCRIPTION OF THE PREFERRED EMBODIMENT

The invention is designed to minimize or eliminate the effects of continuous wave jamming of a communication signal. This is accomplished by a non-linear signal processor using mixing, filtering, and summing operations. The rationale for the invention can be explained in terms of a spectrum or frequency analysis.

Figure 1:
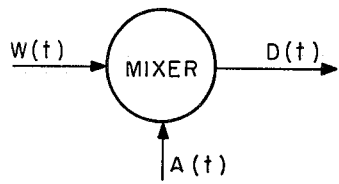
FIGS. 1 and 2 illustrate mixing principles.
Figure 2:
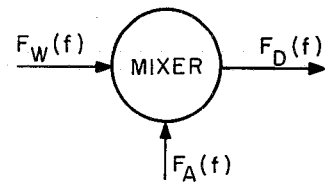

The spectrum effects of the mixing operation can be considered equivalent to multiplication. Thus, a mixer shown in FIG. 1 has an output signal $D(t) = J(t) \times W(t)$, the time domain result of multiplying the input signal $W(t)$ by a single frequency sine (cosine) wave $A(t)$, $J(t)$ being the time domain representation of signal A. It can be shown that multiplication in the time domain corresponds to convolution in the frequency domain. (See, for example, "Communication Systems" by Lathi, published by John Wiley & Sons, New York, N.Y.) Thus, in FIG. 2, the output signal of the mixer shown is $$F_D(f) = \int_{-\infty}^{\infty} F_W(f-u) F_A(u) du$$

where
$F_D(f)$ = frequency domain representation of signal D, the mixer output signal,
$F_A(f)$ = frequency domain representation of signal A, a single frequency sine (cosine) wave input to the mixer,
$F_W(f)$ = frequency domain representation of signal W, the mixer input signal, and
$u$ is a dummy integration variable.
If one of the inputs is a single frequency sine wave, the results of the convolution is (assuming only positive frequencies)

$$F_D(f) = \int_{-\infty}^{\infty} F_W(f-u) F_A(u-f_J) du = F_W(f-f_J).$$

This means that the output spectrum is identical to the input spectrum except that it is translated by $f_J$, the frequency of the signal jamming component J. A subsequent multiplication can be shown to translate the spectrum back to its original location.

Figure 3:
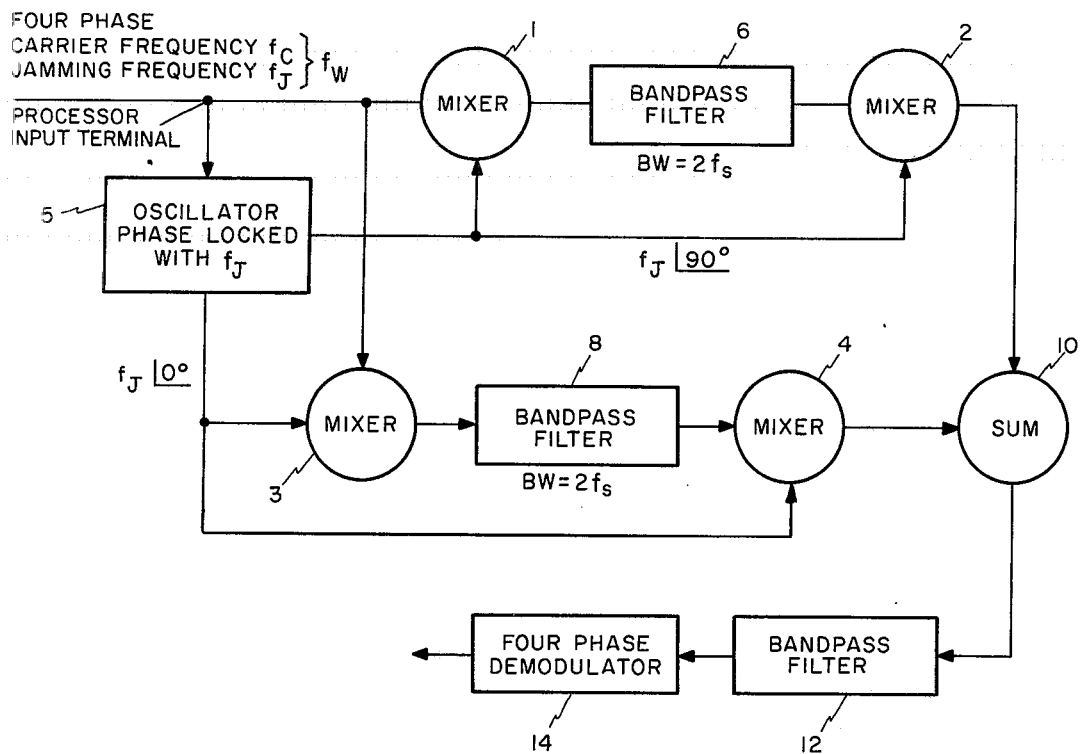
FIG. 3 is a block diagram of the invention.

FIG. 3 shows one way of implementing the principles of applicant's invention. Here is shown a circuit having a four-phase input signal $f_W$ comprised of a carrier rate $f_c$ and a jammer rate $f_J$. Signal $f_W$ is applied to a first mixer 1, a mixer 3, and a phase locked oscillator 5 which is locked to the signal jamming component frequency $f_J$. The output of mixer 1 is connected to the input of a bandpass filter 6 which has an output connected to one input of a mixer 2. The output of mixer 3 is connected to one input of a bandpass filter 8 which has an output connected to one input of a mixer 4. The output signals from mixers 2 and 4 are summed in a summing circuit 10. The output of 10 is passed through a bandpass filter 12 to a conventional four-phase demodulator 14.

Phase locked oscillator 5 is locked to jamming frequency $f_J$ and develops two output signals of frequency $f_J$. One of these, $f_J \lfloor 0°$, is in phase with the jamming frequency and is applied to second inputs of mixers 3 and 4. The second output signal from oscillator 5, $f_J \lfloor 90°$, is 90° out of phase with $f_J$ and is applied to second inputs of mixers 1 and 3.

Oscillator 5 is a phase-locked oscillator which tracks (no long term frequency error) the incoming jamming signal. The phase-locked oscillator (PLO) is a simple device since it is to track only CW or slowly varying CW signals. The PLO operates with a good signal-to-noise ratio since the jammer power to signal power (in the bandwidth of PLO) is assumed to be high, that is, the jammer has a significant power level. Integrated circuit PLO's are becoming available so that the majority of the circuit elements can be deposited on a single IC chip. The free running PLO requirements are minimal allowing a wide choise of oscillator configurations.

Thus the invention comprises two separate channels wherein the input signal $f_W$ is processed. A first channel comprised of mixer 1, filter 6, and mixer 2, mixes $f_W$ and $f_J \lfloor 90°$, filters the mixer output in filter 6, then mixes the filter output with $f_J \lfloor 90°$ in mixer 2. A second channel comprised of mixer 3, filter 8, and mixer 4, mixes $f_W$ with $f_J \lfloor 0°$, filters the product in filter 8, then mixes the filter output with $f_J \lfloor 0°$ in mixer 4. Bandpass filters 6 and 8 each pass a bandwidth of $2f_s$, $f_s$ being the bandwidth of the input signal $f_W$. The sum of the output frequencies of mixers 2 and 4 is filtered in bandpass filter 12 which passes a bandwidth of $2f_s$ centered at $f_c$, the carrier frequency. The output of filter 12 can then be demodulated in four-phase demodulator 14.

If the bandpass filters of FIG. 3 are changed to low pass filters (of bandwidth $2f_s$) then the summed output can be shown to exhibit precisely the same characteristics as the input signal. In other words, the mixing down process is reversible. If only a single channel process were used (i.e., mixers 1 and 2 or 3 and 4 alone) then the process is not reversible and signal characteristics are lost. Use of both in-phase and quadrature components insures a proper recombination of the desired signal. The use of a PLO to precisely track the frequency of the jamming signal insures that the jammer power is converted to direct current or a signal limited to very low frequencies by the first mixing process. (Mixers 1 and 3.) Interposing a bandpass filter (i.e., one which rejects low frequency and d.c. components) effectively eliminates the jammer signal from the reconstituted (summed) output. If the low pass, cutoff frequency of the bandpass filter is small compared to the bandwidth of the signal, $f_s$, then the desired signal is not greatly affected by the filtering process. As an example, if the desired signal bandwidth is $10^6$ Hz and the low frequency cutoff is 10 Hz then the improvement in signal-to-jam ratio can be expected to be approximately $10^6/10$ or 50 dB. The entire process is equivalent to placing a narrow stop band filter around a jammer. The benefit of the invention is that "equivalently" narrower stop bands are provided than would be the case if state-of-the-art stop band filters were to be used at nominal carriers of 70–700 MHz.

Figure 4:
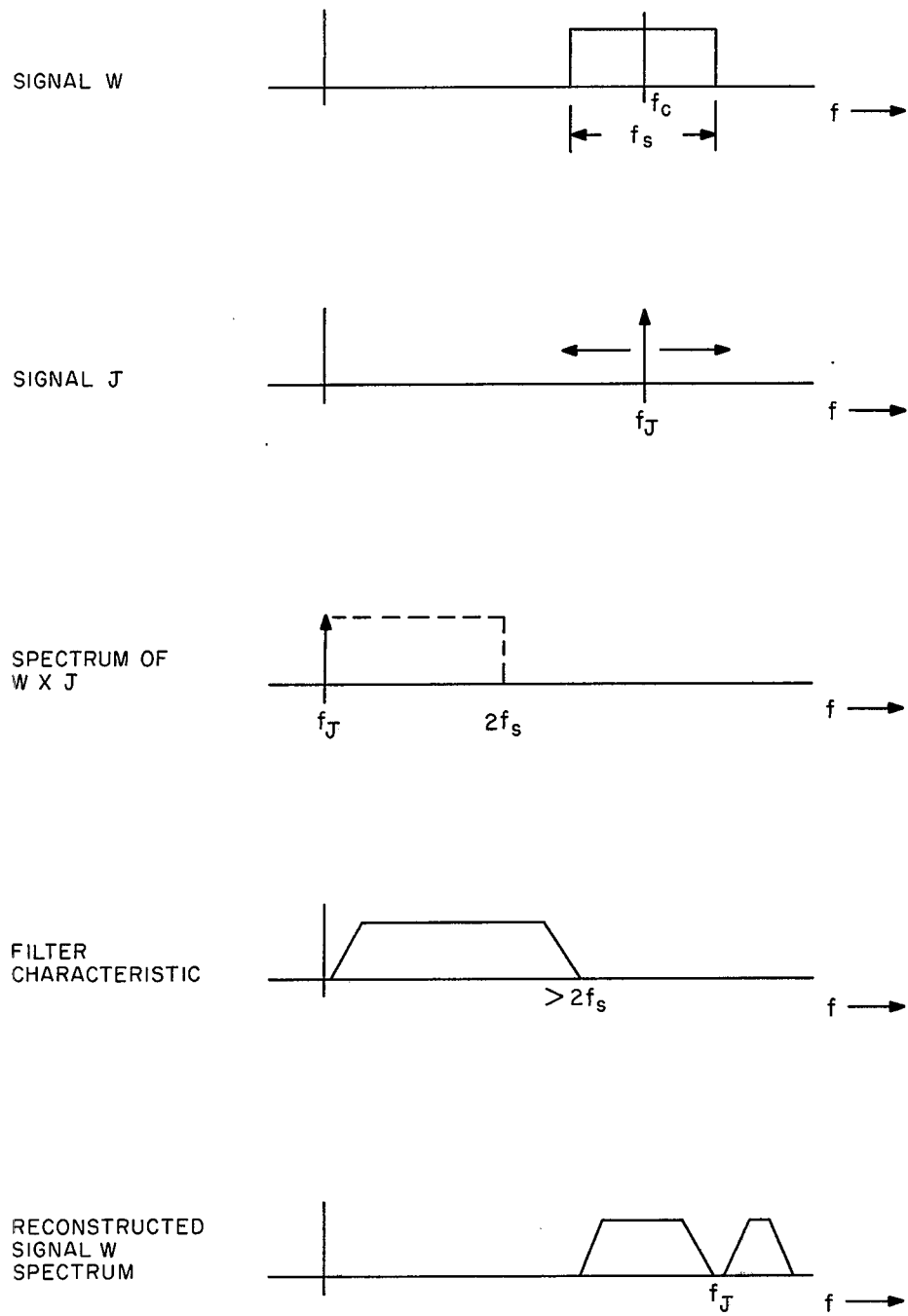
FIG. 4 illustrates several signals and properties of signals.

The two multiplications of the processor input signal by $J \lfloor 0°$ and by $J \lfloor 90°$ permit the summed final output to exhibit a spectrum identical to the processor input signal. In other words, the signal can be translated to baseband and back up to some nominal IF location (for example $f_c$) without loss. The results of interposing the bandpass filters between the mixing operations are shown in FIG. 4 which shows the spectrums of signals W, J, W × J, and W reconstructed. As shown in FIG. 4, the output signal spectrum is identical except for a "dropped" slot. This slot corresponds to twice the low frequency cutoff of the interposed bandpass filter. Thus, the nonlinear processor of the invention can discriminate against CW (narrow band) interference when the interference occurs in the passband of a wideband signal transmission by essentially causing a band rejection filter to track the CW jamming signal. The same desired signal energy is lost, but if a sufficiently narrow band rejection can be achieved, net improvement in the signal-to-jammer ratios in the order of 30–60 dB can be achieved. Herein lies the advantage of the suggested technique over the prior art. The first mixing process (homodyne) allows filter realization which results in narrow slot rejection which is essentially limited by the dynamics of the jammer and the tracking capability of the phase lock loop. Other techniques using tracking filters, amplitude-phase cancellation, and slot rejection or bandstop filters are all practically limited by the precision and quality of components available.

I claim:

1. In a nonlinear processor for discriminating against CW interference, the improvement comprising:
    a processor input terminal adapted to receive a signal including a jamming frequency,
    a first channel comprising a first mixer, a second mixer, and a first bandpass filter,
    means connecting said first bandpass filter in series between said first mixer and said second mixer,
    a second channel comprising a third mixer, a fourth mixer, and a second bandpass filter,
    means connecting said second bandpass filter in series between said third mixer and said fourth mixer,
    means connecting said processor input terminal to an input of said first and third mixers,
    a phase locked oscillator having an input terminal, means connecting said processor input terminal to said oscillator input terminal to provide a signal to lock said oscillator to said jamming frequency, a first output connected to respective inputs of said first and second mixers, and a second output connected to respective inputs of said third and fourth mixers,
    a summing circuit connected to sum the outputs of said second and fourth mixers, and
    a third bandpass filter connected to filter the output of said summing circuit.

2. The apparatus of claim 1, said phase locked oscillator being adapted to
    supply a phase displaced jamming frequency to said first and second mixers from said first output of said oscillator, and to
    supply said jamming frequency in phase to said third and fourth mixers from said second output of said oscillator.

3. The apparatus of claim 2, said first and second bandpass filters being adapted to pass a bandwidth equal to twice the bandwidth of the signal received at said processor input terminal, and to block D.C., said third bandpass filter being adapted to pass a bandwidth equal to twice the bandwidth of the signal received at said processor input terminal and centered at the frequency of said jamming component.

* * * * *